April 8, 1924.
H. R. SEIFERT
PISTON RING
Filed June 17, 1920
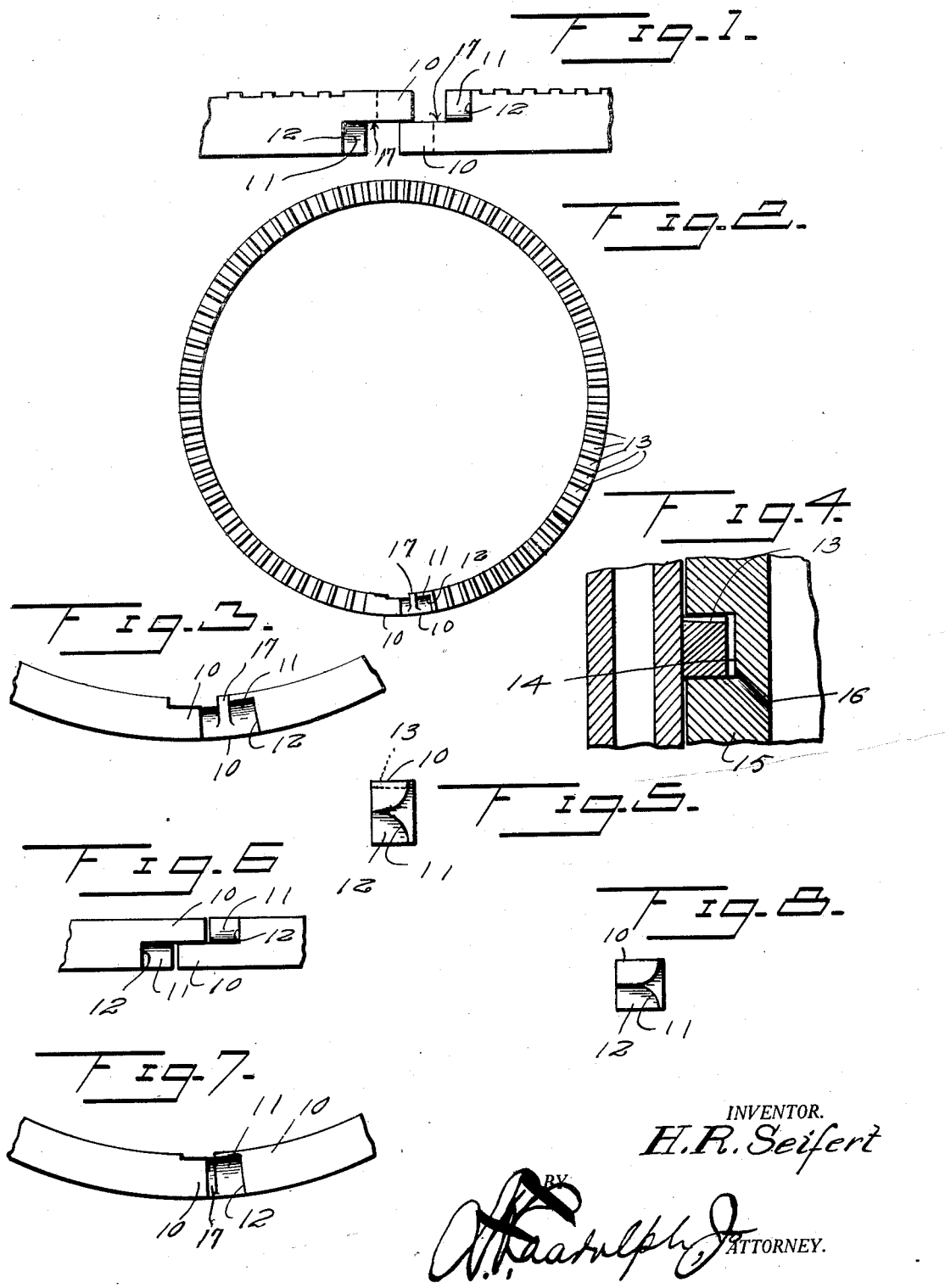

Patented Apr. 8, 1924.

1,489,335

UNITED STATES PATENT OFFICE.

HENRY RICHARD SEIFERT, OF ELLSWORTH, WISCONSIN.

PISTON RING.

Application filed June 17, 1920. Serial No. 389,640.

*To all whom it may concern:*

Be it known that I, HENRY RICHARD SEIFERT, a citizen of the United States, residing at Ellsworth, in the county of Pierce and State of Wisconsin, have invented certain new and useful Improvements in Piston Rings; and I do hereby declare the following to be a full, clear, and exact description of the invention, such as will enable others skilled in the art to which it appertains to make and use the same.

The object of the invention is to provide a simple and efficient piston ring adapted for use in connection with either explosion or steam engines or compressors and the like, said rings being of the expansion type and having an improved construction of lap joints for preventing leakage while serving to keep the oil down in the cylinder, to minimize carbonization in connection with explosion engines, and incidentally to provide for the efficient disposal of the oil deflected from the surface of the cylinder by the engagement therewith of the ring; and with these objects in view the invention consists in a construction and combination of parts of which a preferred embodiment is shown in the accompanying drawing, wherein—

Figure 1 is a side view of a ring embodying the invention.

Figure 2 is a plan view of the same.

Figure 3 is a view in plan showing the opposite side of the ring.

Figure 4 is a sectional view of the ring arranged in a piston adjacent to and in operative relation with a cylinder wall.

Figure 5 is an end view of one of the ring terminals.

Figure 6 is an edge view of a ring having a plane surface.

Figure 7 is a plan view, and

Figure 8 is an end view of the ring illustrated in Figure 5.

The ring embodying the invention is of the split type with its terminals constructed to form a step joint consisting of the overlapping tongues 10 meeting for sliding engagement in a plane substantially midway between the opposite edge surfaces. These tongues are convexly rounded at their inner surfaces on oblique planes for reception by the concave sockets 11 terminating in the shoulders 12 at the bases or inner ends of the tongues, so that when the tongues are in overlapping relation with their extremities respectively fitted in the sockets provided for their reception, there is no unobstructed passage through the plane of the ring either radially or longitudinally of the piston by which the ring is carried. The tongue and socket on one terminal of the ring combine to occupy the full width of the ring, and the tongue is of a radial depth which is approximately equal to the thickness of the ring—less only a relatively thin web constituting the edge of the socket, so that leakage or passage of oil past the plane of the ring is prevented and oil scraped from the wall of the cylinder is directed by radial grooves 13 formed on one face of the ring, into the ring seat or channel 14 in the piston represented at 15, from which it may be directed by suitable ducts 16 to the crank chamber.

At the junction of the tongues 10 and socket 11, relatively short flat walls 17 are provided for contact with each other to prevent relative turning movement of the tongues.

In the modified construction of ring illustrated in Figures 5, 6 and 7 the oil directing grooves are omitted.

Having thus described the invention, what I claim is:—

1. A piston ring having each of its ends provided with two inclined surfaces one facing inwardly and the other outwardly whose inclinations are in opposite directions and transversely of the ring, both of said surfaces extending from approximately the middle of one vertical wall of the ring and thence to a point adjacent the opposite upper and lower corners respectively thereof.

2. A piston ring provided with a joint, said joint comprising two pair of beveled surfaces, the beveled surfaces of each pair being inclined in opposite directions and successively arranged in stepped relation, said beveled surfaces terminating adjacent the inner side of the ring.

3. A piston ring having each of its ends provided with two successively arranged inclined surfaces whose inclinations are in opposite directions and transversely of the ring, both of said surfaces extending from substantially the middle of one vertical wall of the ring and thence to a point adjacent the opposite upper and lower corners respectively thereof.

4. A piston ring comprising a main body portion and ends formed by incising the same by only ten vertical and oblique faces, each end being provided with two faces in an oblique plane and three faces in a vertical plane, said faces cooperating when brought together to form a spliced joint locking the free ends in such manner that radial pressure applied to either end will produce a like radial pressure in the other end.

5. A split piston ring having overlapping end portions each of which is formed with a pair of oppositely disposed inclined faces that are arranged on opposite sides of the longitudinal center of the overlapping end portion, there being a substantially triangular abutment face formed at the center of the overlapping portion between the inclined faces, said triangular abutment face extending from the inner face of the ring to a point on the outer face thereof between the outer edges of the inclined faces, and there being triangular abutment faces formed on the body of the ring at the ends of the inclined faces opposite from the intermediate triangular abutment face.

6. The structure defined in claim 1 in which the engaging inclined surfaces of the two ends of the ring are cylindrical.

7. The structure defined in claim 2 in which the projecting end portions of the ring have conversely cylindrical inclined surfaces and the co-operating end portions of said ring have concavely cylindrical inclined surfaces.

In testimony whereof I affix my signature in presence of two witnesses.

HENRY RICHARD SEIFERT.

Witnesses:
GUST ZOEBOCK,
WILL RUDOLPH.